US010647050B2

(12) United States Patent
Mueller et al.

(10) Patent No.: US 10,647,050 B2
(45) Date of Patent: *May 12, 2020

(54) MOLDING PROCESS FOR INSULATION PRODUCT

(71) Applicant: KNAUF INSULATION, INC., Shelbyville, IN (US)

(72) Inventors: Gert R. Mueller, New Albany, OH (US); Robert W. Zembrodt, Carmel, IN (US); Charles F. Appley, Cumberland, IN (US); Walter A. Johnson, Columbus, IN (US); Steven L. Collings, Shelbyville, IN (US)

(73) Assignee: Knauf Insulation, Inc., Shelbyville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/386,633

(22) Filed: Apr. 17, 2019

(65) Prior Publication Data

US 2019/0240893 A1 Aug. 8, 2019

Related U.S. Application Data

(63) Continuation of application No. 14/775,955, filed as application No. PCT/US2014/024658 on Mar. 12, 2014, now Pat. No. 10,307,955.

(Continued)

(51) Int. Cl.
*B29C 35/06* (2006.01)
*B29C 51/42* (2006.01)
(Continued)

(52) U.S. Cl.
CPC ............ *B29C 51/421* (2013.01); *B29C 35/06* (2013.01); *B29C 35/10* (2013.01); *B29C 43/203* (2013.01);
(Continued)

(58) Field of Classification Search
CPC . B29C 35/06; B29C 35/10; B29C 2035/0822; B29C 2035/0855; B29C 2035/1658
(Continued)

(56) References Cited

U.S. PATENT DOCUMENTS 3,861,971 A 1/1975 Stapleford et al.
4,131,664 A 12/1978 Flowers et al.
(Continued)

FOREIGN PATENT DOCUMENTS

| EP | 0447090 A1 | 9/1991 |
| EP | 0470584 A2 | 2/1992 |
| WO | 2014/165176 A2 | 10/2014 |

OTHER PUBLICATIONS

International Search Report received for PCT Patent Application No. PCT/US2014/024658, dated Nov. 17, 2014, 5 pages.
(Continued)

*Primary Examiner* — Christina A Johnson
*Assistant Examiner* — Xue H Liu
(74) *Attorney, Agent, or Firm* — Knauf Insulation, Inc.; James K. Blodgett

(57) ABSTRACT

A molding process includes the operation of placing insulation material comprising fibers and binder on the fibers in a mold cavity. The molding process further includes the operation of transferring heat to the insulation material to cause the binder to cure.

12 Claims, 4 Drawing Sheets

Related U.S. Application Data

Figure 1:
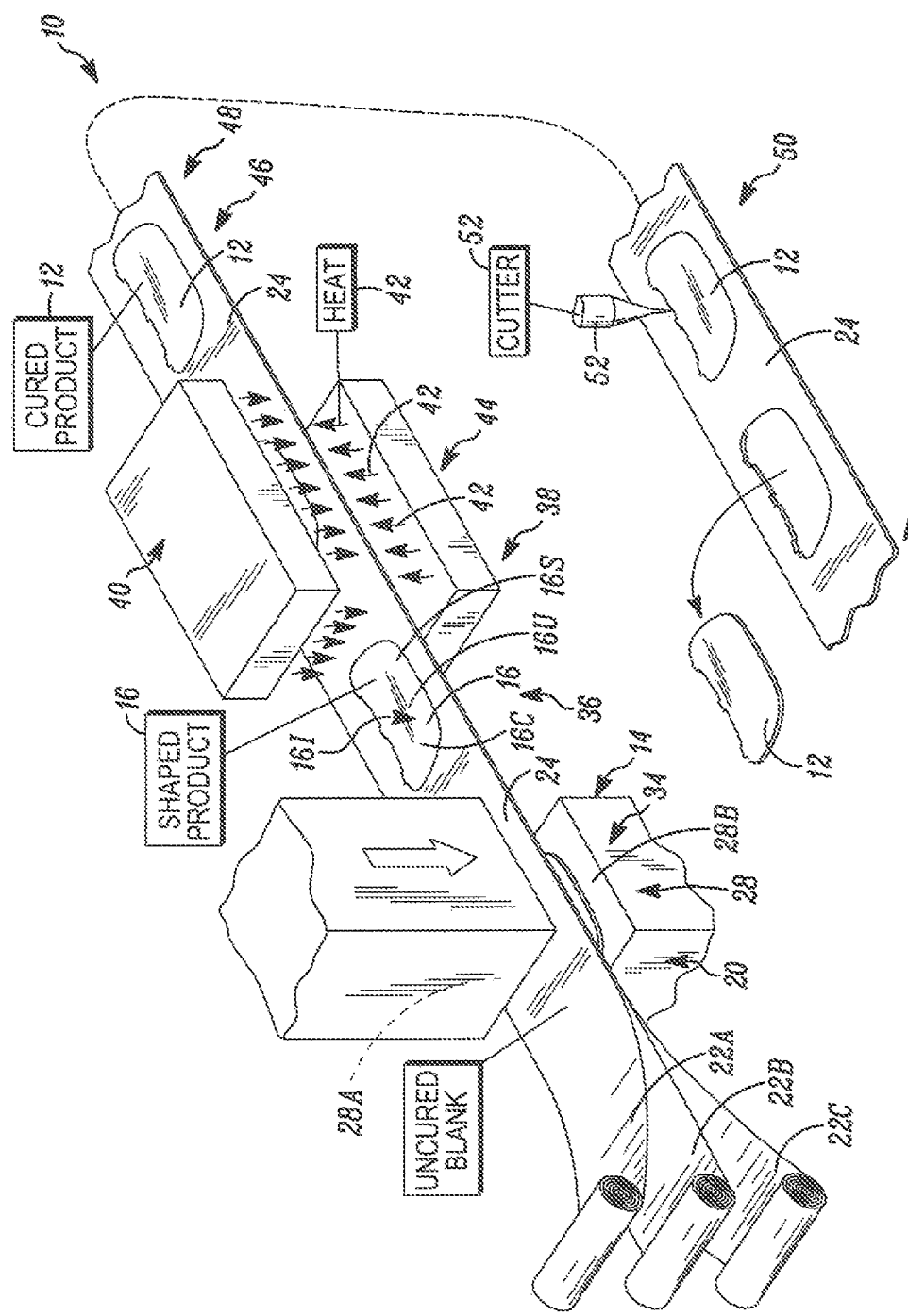

(60) Provisional application No. 61/779,732, filed on Mar. 13, 2013.

(51) Int. Cl.

| | | |
|---|---|---|
| *B29C 35/10* | (2006.01) | |
| *B29C 43/20* | (2006.01) | |
| *B29C 71/02* | (2006.01) | |
| B29C 35/08 | (2006.01) | |
| B29C 35/16 | (2006.01) | |
| B29C 43/36 | (2006.01) | |
| B29L 31/00 | (2006.01) | |
| B29K 105/12 | (2006.01) | |
| D04H 1/587 | (2012.01) | |
| D04H 1/655 | (2012.01) | |
| B29K 103/00 | (2006.01) | |
| B29K 105/00 | (2006.01) | |
| B29K 509/08 | (2006.01) | |
| B29K 511/00 | (2006.01) | |

(52) U.S. Cl.
CPC .............. *B29C 71/02* (2013.01); *B29C 43/36* (2013.01); *B29C 2035/0822* (2013.01); *B29C 2035/0855* (2013.01); *B29C 2035/1658* (2013.01); *B29K 2103/00* (2013.01); *B29K 2105/12* (2013.01); *B29K 2105/128* (2013.01); *B29K 2105/253* (2013.01); *B29K 2509/08* (2013.01); *B29K 2511/00* (2013.01); *B29K 2995/0002* (2013.01); *B29K 2995/0015* (2013.01); *B29L 2031/776* (2013.01); *D04H 1/587* (2013.01); *D04H 1/655* (2013.01)

(58) Field of Classification Search
USPC .......................................................... 264/325
See application file for complete search history.

(56) References Cited

U.S. PATENT DOCUMENTS

| | | |
|---|---|---|
| 4,517,147 A | 5/1985 | Taylor et al. |
| 5,217,654 A | 6/1993 | Buckley |
| 5,217,656 A | 6/1993 | Buckley et al. |
| 6,838,148 B1 | 1/2005 | Ehnert et al. |
| 2009/0275699 A1 | 11/2009 | Zhang et al. |
| 2012/0208935 A1 | 8/2012 | Tutin et al. |

OTHER PUBLICATIONS

International Preliminary Report on Patentability received for PCT Patent Application No. PCT/US2014/024658, dated Sep. 24, 2015, 7 pages.

Office action for co-pending U.S. Appl. No. 14/775,955 (7 pages)—dated Sep. 21, 2018

MOLDING PROCESS FOR INSULATION PRODUCT

CROSS-REFERENCE TO RELATED APPLICATION

This application is a continuation of U.S. application Ser. No. 14/775,955, filed Sep. 14, 2015, which is a U.S. national counterpart application of International Application Serial No. PCT/US2014/024658, filed Mar. 12, 2014, under 35 U.S.C. § 371, which claims priority under 35 U.S.C. § 119(e) to U.S. Provisional Application Ser. No. 61/779,732, filed Mar. 13, 2013, the entire disclosures of which are hereby incorporated herein by reference.

BACKGROUND

The present disclosure relates to a process for making an insulation product, and particularly to a molding process. More particularly, the present disclosure relates to a molding process for making an insulation product where binder included in the insulation product is cured during the molding process.

SUMMARY

A molding process for molding a cured product may include several operations. One of the operations may be providing an uncured blank including fibers and uncured binder. The molding process may include inserting the uncured blank in a mold cavity and closing the mold. The molding process may further include applying heat and pressure to the uncured blank to cause the uncured blank to adopt and retain a shape of the mold cavity.

In some embodiments, the operation of applying heat and pressure to the uncured blank may be only sufficient to cure a portion of the binder included in the uncured part. As a result, the uncured blank may retain a molded shape after the removal from the mold and a shaped product may be established. The molding process may further include the operations of opening the mold to release the shaped product.

In some embodiments, the molding process may further include the operation of inserting the shaped product in a heater. The molding process may further include the operation of transferring a curing heat to the shaped product to cause the remainder of the uncured binder to cure. As a result, the cured product may be established.

In some embodiments, the uncured binder may be a phenol-formaldehyde binder. In some embodiments, the uncured binder may be a substantially formaldehyde free binder.

In some embodiments, during the transferring the shaping heat operation, the shaping heat may be applied by the mold. During the transferring the curing heat operation, the curing heat may be applied by a heating unit in spaced-apart relation to the mold.

In some embodiments, the uncured part may be exposed to a temperature of about 200 degrees Fahrenheit to about 500 degrees Fahrenheit. The transferring the shaping heat operation may occur during a first cycle time. The transferring the curing heat operation may occur during a second cycle time. The second cycle time may be larger than the first cycle time.

A molding process may comprise several operations. The molding process may include the operation of providing an uncured blank including fibers and uncured binder.

In some embodiments, the molding process may further include the operation of molding the uncured blank to establish a shaped product having a molded shape that does not change after removal from a mold cavity. The shaped product may include the fibers, a first portion of cured binder, and a remainder of the uncured binder.

In some embodiments, the uncured binder may be a phenol-formaldehyde binder. The uncured binder may be a substantially formaldehyde free binder.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
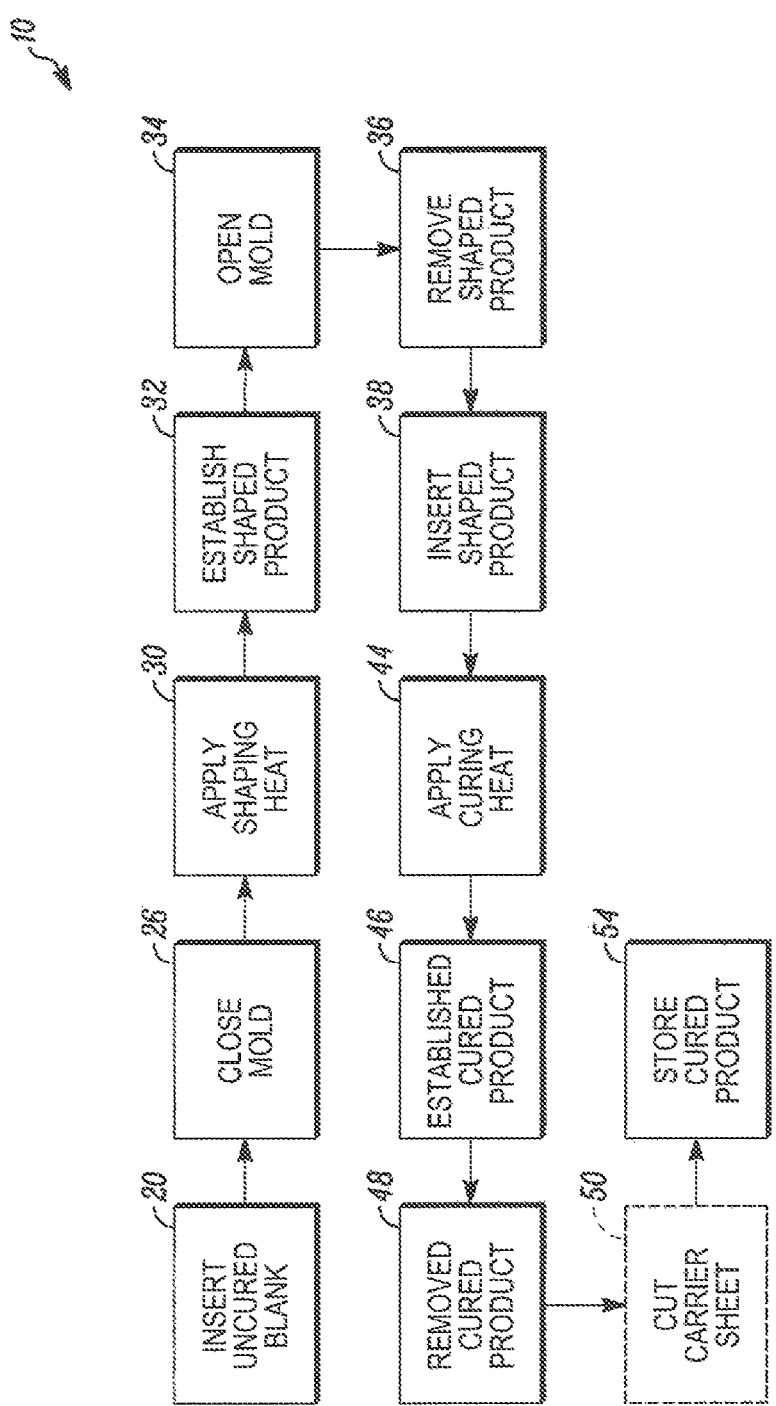
Figure 3:
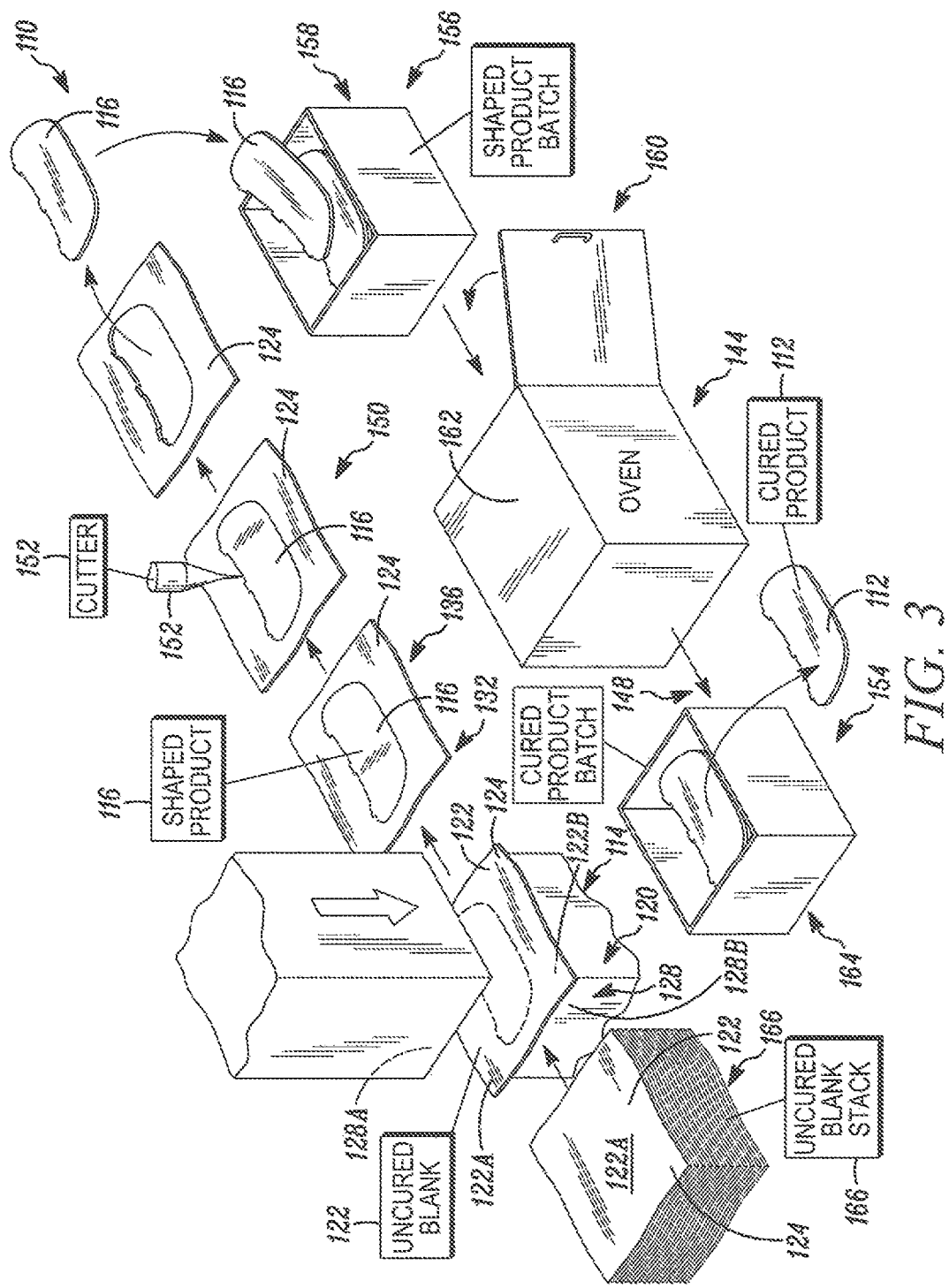
Figure 4:
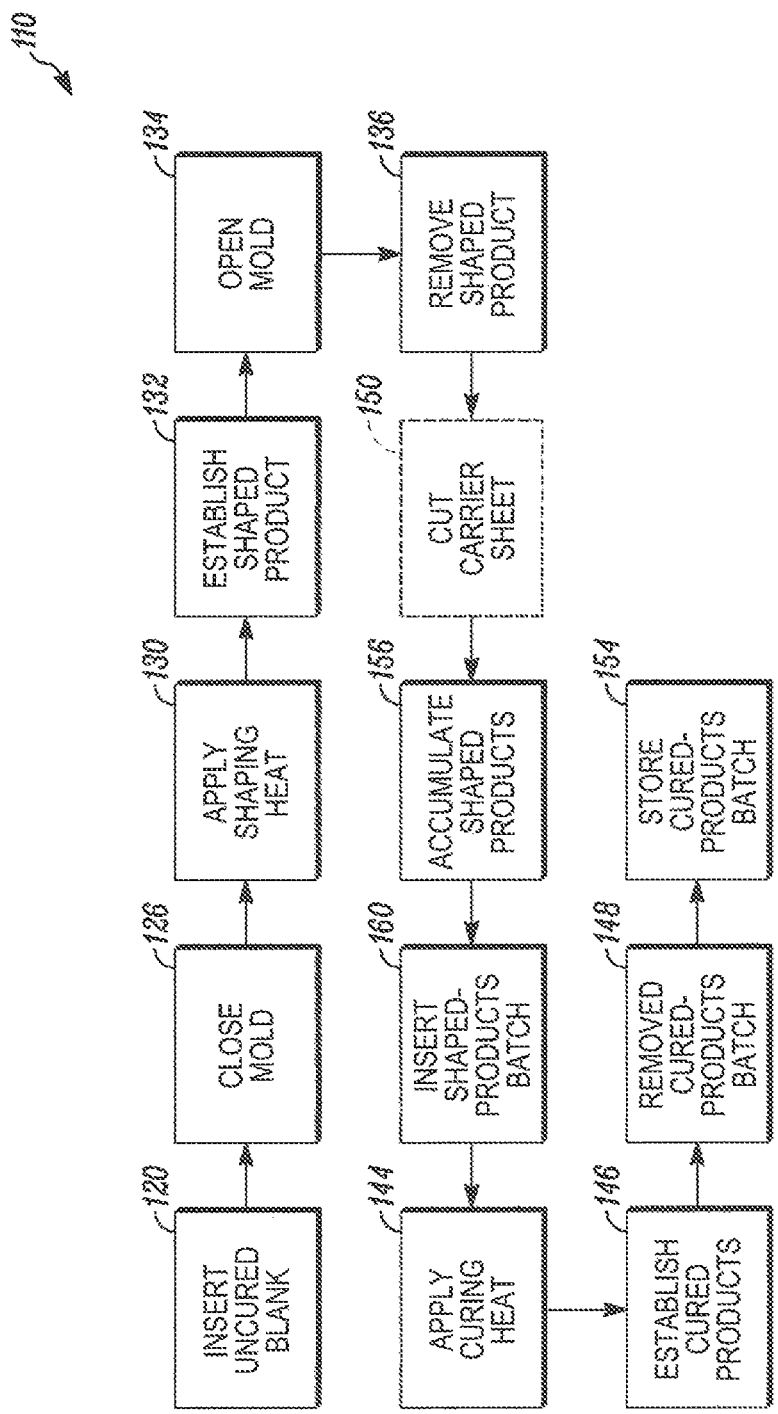

The detailed description particularly refers to the accompanying figures in which:

FIG. 1 is a diagrammatic and perspective view of a first embodiment of a molding process in accordance with the present disclosure showing that the molding process includes the operations of inserting an uncured blank into a mold cavity, shaping and applying heat to the uncured blank, removing a shaped product from the mold cavity, applying heat to the shaped product to establish a cured product, cutting the cured product from a carrier sheet, and storing the cured product;

FIG. 2 is a diagrammatic view of the molding process of FIG. 1 showing that the molding process includes the operations of inserting the uncured blank, closing the mold, applying a shaping heat, establishing the shaped product, opening the mold, removing the shaped product, inserting the shaped product into a heating unit, applying a curing heat from the heating unit, establishing the cured product, removing the cured product, optionally cutting the carrier sheet, and storing the cured product;

FIG. 3 is a diagrammatic and perspective view of another embodiment of a molding process in accordance with the present disclosure showing that the molding process includes the operations of inserting an uncured blank into a mold cavity, shaping and applying heat to the uncured blank, removing a shaped product from the mold cavity, optionally cutting the carrier sheet to free the shaped product, accumulating the shaped products to establish a shaped-products batch, applying heat to the shaped product to establish a cured-products batch, and storing the cured-products batch; and FIG. 4 is a diagrammatic view of the molding process of FIG. 3 showing that the molding process includes the operations of inserting the uncured blank, closing the mold, applying a shaping heat, establishing the shaped product, opening the mold, removing the shaped product, optionally cutting the carrier sheet, accumulating the shaped products, inserting the shaped-products batch, applying a curing heat, establishing the cured-products batch, removing the cured-products batch, and storing the cured-products batch.

DETAILED DESCRIPTION

A first embodiment of a molding process 10 is shown, for example, in FIGS. 1 and 2. The molding processes 10 and 110 are used to establish a cured product 12 while minimizing a cycle time of a molding machine 14. The cycle time is minimized by first establishing a shaped product 16 and second curing the shaped product 16 to establish the cured product 12. The shaped product 16 includes fibers, a cured-binder portion 16C along an outer surface 16S of the shaped product 16, and an uncured-binder portion 16U in an interior region 161 defined by the outer surface 16S of the shaped product 16. The cured product 12 is established when the uncured-binder portion 16U of the shaped product is transformed into cured binder so that only cured binder exists in the cured product 12. The molding process 10, as shown in FIG. 1, is an illustrative example of a continuous process. The molding process 110, as shown in FIG. 3, is an illustrative example of a batch process.

The molding process 10 includes a series of operations as shown in FIGS. 1 and 2. The molding process 10 includes an operation 20 in which an uncured blank 22 is inserted into the molding machine 14 as shown in FIG. 1. The uncured blank 22 is carried by a carrier sheet 24 into the molding machine 14 as part of a continuous process. In the example shown in FIG. 1, the uncured blank 22 includes an outer trim layer 22A, a first blanket 22B, and a second blanket 22C. Each blanket 22B, 22C is made of a substrate and an uncured binder. In one example, the substrate is a fiber. For example, the fiber is glass, cellulose, or mineral wool. In still yet another example, the substrate may be a laminate or a veneer. For example, the laminate or veneer is a wood chip or wood particle. In addition, the uncured blank may have any number of blankets and trim layers. In addition, the uncured blank may include a thermoplastic layer, also called an interleaf, located between each neighboring pair of blankets to interconnect the neighboring pairs of blankets. The interleaf may be located between the trim layer and the blanket.

The molding process 10 then proceeds to an operation 26 in which a mold system 28 included in the molding machine 14 is moved from an opened position shown in FIG. 1 to a closed position. The mold system 28 includes, for example, a first mold tool 28A and a second mold tool 28B. In the illustrative example, the first mold tool 28A is a female mold tool and the second mold tool 28B is a male mold tool. The uncured blank 22 is trapped in a mold cavity formed in the mold system 28 when the mold system 28 is in the closed position.

However, it is within the scope of the present disclosure for the mold system to include a first platen and a second platen for forming relatively flat panels from the uncured blank 22. It is further within the scope of the present disclosure for the mold system to include a first mold tool, a first platen, a second mold tool, and a second platen.

The molding process 10 then proceeds to an operation 30 in which heat and pressure are applied to the uncured blank 22 as shown in FIG. 2. While the mold system 28 is in the closed position, heat and pressure are applied to the uncured blank 22 to cause a shape of the mold cavity to be taken on by the uncured blank 22. In addition, the heat applied by the mold system 28 causes a first portion of the binder included in the uncured blank 22 to be cured. In another example, hot gas may be directed through the mold cavity while the uncured product is located in the mold cavity. As a result, cycle time of the molding machine may be further minimized due to increased convective heat transfer from the hot gas to the uncured product.

This type of molding operation may be called shape molding. Shape molding is a process by which the uncured blank is intentionally only partly cured. The degree of cure is generally chosen to ensure that the uncured blank retains its shape from the molding system 10 and satisfies all dimensional requirements when the shaped product is removed from a mold cavity formed in the molding machine 14. Some portions of a shaped product, typically portions in the core, are not fully cured. The shape-molded product is subjected to a subsequent secondary curing process to ensure full cure as described below in an operation 44.

Once the first portion of binder is cured, the molding process 10 proceeds to an operation 32 in which a molded shape is retained and the shaped product 16 is established. The shaped product 16 includes fibers, the first cured portion of binder, and a second uncured portion located in an interior region of the shaped product 16. The molding machine 14 has a cycle time which is measured from the closure of the mold system 28 to the opening of the mold system 28. In one example, the cycle time is between about 30 seconds and about 10 minutes. However, cycle time is dependent on part thickness, binder type used, and density of the uncured blank 22.

As an example, the first portion of cured binder is located along a surface of the shaped product 16 that interfaces and engages an inner surface of the mold system 28. The first portion of cured binder is sufficient to retain the molded shape of the shaped product 16 once the shaped product 16 is removed from the mold system 28.

The molding process 10 then proceeds to an operation 34 in which the mold system 28 is moved from the closed position to the opened position. As a result, the shaped product 16 is freed for removal as suggested in FIG. 2.

The molding process 10 then proceeds to an operation 36 in which the shaped product 16 is removed from the mold system 28 as shown in FIGS. 1 and 2. As shown, for example, in FIG. 1, the shaped product 16 is still coupled to the carrier sheet 24. However, it is within the scope of the present disclosure for the molding machine 14 to also separate the shaped product 16 from the carrier sheet 24 as part of the operation 30.

The molding process 10 then proceeds to an operation 38 in which the shaped product 16 is inserted into a heating unit 40 as shown in FIG. 1. The heating unit 40 is, for example, a heat tunnel using infrared lamps to provide a curing heat 42 that is applied to the shaped product 16. The curing heat 42, for example, causes an air temperature in the heat tunnel to be about 200 degrees Fahrenheit to about 500 degrees Fahrenheit. These temperatures may be similar to or equal to temperatures achieved during the operation 30.

Once the shaped product 16 is in the heating unit 40, curing heat 42 is applied to the shaped product 16 in an operation 44 as shown in FIGS. 1 and 2. Curing heat 42 is applied to the shaped product 16 to cause the second portion of uncured binder to cure. As a result, substantially all binder in the shaped product 16 is now cured. The heating unit 40 also includes a cycle time measured from when one part enters the heating unit 40 to when a different part exits the heating unit 40. As a result, the cycle time of the heating unit is substantially the same as the molding machine 14. However, the amount of time any given shaped product 16 remains in the heating unit 40 may vary and be a multiple of the cycle time of the molding machine 14.

The molding process 10 proceeds to an operation 46 in which all the second portion of binder has cured in the shaped product 16 so that all the binder has been cured. As a result, the cured product 12 is established in the operation 46 as shown in FIGS. 1 and 2.

The molding process 10 then proceeds to an operation 48 in which the cured product 12 is removed from the heating unit 40 as shown in FIGS. 1 and 2. The cured product 12 is, for example, still carried by the carrier sheet 24. However, substantially all the binder has now been cured.

The molding process 10 then proceeds to an optional operation 50 in which the cured product 12 is separated from the carrier sheet 24. As discussed previously, the shaped product 16 may have been separated from the carrier sheet in the operation 30. However, the shaped product 16 may have remained coupled to the carrier sheet 24 to simplify transportation of the carrier sheet 24 and shaped product 16 through subsequent operations. As a result, the molding process 10 may separate the cured product 12 from the carrier sheet 24 in the operation 50. As an example, the operation 50 uses a cutter 52, which in the illustrative example is a water cutter, cuts the carrier sheet 24 to free the cured product 12 as shown in FIG. 1. However, the cutter 52 may be another suitable alternative.

The molding process 10 then proceeds to an operation 54 as shown in FIGS. 1 and 2. The operation 54 causes the cured product 12 to be stored for transportation or storage.

The molding process 110 includes a series of operations as shown in FIGS. 2 and 3. The molding process 110 includes an operation 120 in which an uncured blank 122 is removed from an uncured-blank stack 166 and inserted into the molding machine 114 as shown in FIG. 3. The uncured blank 122 is carried by a carrier sheet 124 into the molding machine 114 as part of a batch process. In the example shown in FIG. 3, the uncured blank 122 includes a series of layers that include, for example, an outer trim layer 122A and a blanket 122B. However, it is within the scope of the present disclosure for uncured blank 122 to have any number of blankets, trim layers, or polymeric binding layers. The blanket 122B is made of fibers and uncured binder.

The molding process 110 then proceeds to an operation 126 in which a mold system 128 included in the molding machine 114 is moved from and opened position shown in FIG. 3 to a closed position. The mold system 128 includes, for example, a first mold tool 128A and a second mold tool 128B. The uncured blank 122 is trapped in a mold cavity formed in the mold system 128 when the mold system 128 is in the closed position.

The molding process 110 then proceeds to an operation 130 in which heat and pressure are applied to the uncured blank 122 as shown in FIG. 4. While the mold system 128 is in the closed position, heat and pressure are applied to the uncured blank 122 to cause a shape of the mold cavity to be taken on by the uncured blank 122. In addition, the heat applied by the mold system 128 causes a first portion of the binder included in the uncured blank 122 to be cured.

Once the first portion of binder is cured, the molding process 110 proceeds to an operation 132 in which a molded shape is retained and the shaped product 16 is established. The shaped product 116 includes fibers, the first cured portion of binder, and a second uncured portion located an interior region of the shaped product 116. The molding machine 114 has a cycle time that is measured from the closure of the mold system 128 to the opening of the mold system 128. In one example, the cycle time is between about 30 seconds and about 10 minutes. However, cycle time is dependent on part thickness, binder type used, and density of the uncured blank 122.

As an example, the first portion of cured binder is located along a surface of the shaped product 116 that interfaces and engages an inner surface of the mold system 128. The first portion of cured binder is sufficient to retain the molded shape of the shaped product 16 once the shaped product 16 is removed from the mold system 128.

The molding process 110 then proceeds to an operation 134 in which the mold system 128 is moved from the closed position to the opened position. As a result, the shaped product 116 is freed for removal as suggested in FIG. 4.

The molding process 110 then proceeds to an operation 136 in which the shaped product 116 is removed from the mold system 28 as shown in FIGS. 3 and 4. As shown, for example, in FIG. 3, the shaped product 116 is still coupled to the carrier sheet 124. However, it is within the scope of the present disclosure for the molding machine 114 to also separate the shaped product 116 from the carrier sheet 124 as part of the operation 130.

The molding process 10 then proceeds to an optional operation 150 in which the shaped product 116 is separated from the carrier sheet 124. As discussed previously, the shaped product 116 may have been separated from the carrier sheet in the operation 130. However, the shaped product 116 may have remained coupled to the carrier sheet 124 to simplify transportation of the carrier sheet 124 and shaped product 116 through subsequent operations. As a result, the molding process 110 may separate the shaped product 116 from the carrier sheet 124 in the operation 150. As an example, the operation 150 uses a cutter 152, which in the illustrative example is a water cutter, cuts the carrier sheet 124 to free the shaped product 116 as shown in FIG. 3. However, the cutter 52 may be another suitable alternative.

The molding process 110 then proceeds to an operation 156 in which the shaped products 116 are accumulated to establish a shaped-products batch 158 as shown in FIGS. 3 and 4. The shaped-products batch 156 may be several shaped products 116 stacked on one another and located in a bin. However, the shaped-products batch 156 may be several shaped products 116 located on trays in a rack spaced apart from one another to facilitate movement of air and relatively faster curing.

Once the shaped-products batch 156 is established, the molding process 110 proceeds to an operation 160 in which the shaped-products batch 156 is inserted into an oven 162 for batch curing of the shaped products 116 as shown in FIG. 3. As an example, the oven 162 is configured to apply the curing heat to the shaped products 116 to cause the second portion of uncured binder to cure. The oven 162 may apply the curing heat using infrared heaters, an open flame to heat the air in the oven, or any other suitable alternative. The curing heat 42, for example, causes an air temperature in the heat tunnel to be about 200 degrees Fahrenheit to about 500 degrees Fahrenheit. These temperatures may be similar to or equal to temperatures achieved during the operation 130.

Once the shaped-products batch 158 is in the oven 162, curing heat is applied to the shaped-products batch 158 in an operation 144 as shown in FIGS. 3 and 4. Curing heat is applied to the shaped-products 158 to cause the second portion of uncured binder to cure. As a result, substantially all binder in each shaped product 116 is now cured. The oven also includes a cycle time measured from when the shaped-products batch 158 enters the oven 162 to when the shaped-products batch 158 exits the oven 162. As a result, the cycle time of the heating unit may be substantially different due to the number of shaped products 116 included in the shaped-products batch 158.

The molding process 110 proceeds to an operation 146 in which all the second portion of the binder has been cured to cause all the binder to be cured. As a result, a cured-products batch 164 is established in the operation 146 as shown in FIGS. 3 and 4.

The molding process 110 then proceeds to an operation 148 in which the cured-products batch 164 of cured products 112 are removed from the oven 162 as shown in FIGS. 3 and 4.

The molding process 110 then proceeds to an operation 154 as shown in FIGS. 3 and 4. The operation 154 causes the cured products 112 to be stored for transportation or storage.

The molding processes 10, 110 fully cure the thermosetting binder of partly mold-pressed parts (shaped products). In the first operation of the process, a part, also called a blanket, (i.e. a collection of fiberglass) impregnated with a thermosetting binder is shape-molded using a heated mold press. The shaped product includes portions of the thermosetting binder that are cured and uncured while the molded shape is retained. This is referred as shape molding and is a molding process that provides a molded part having sufficient integrity to keep its intended shape.

As an example, the thermosetting binder, after shape-molding, is not fully cured. In particular, the binder in a core of the shaped product is not fully cured. The shape-molded part is subsequently subjected to a secondary curing operation to fully cure the part. This secondary curing can be arranged to be in-line with the mold press in such a fashion that the shape-molded part directly is subjected to the secondary curing operation without any or significant heat loss.

The heat for the secondary curing may be provided by radiant heaters (i.e. IR heaters) arranged on top and or below the part when exiting the mold press or oven zones adjacent or attached to the mold press. The shape molded parts pass through the heating zones, supported by a conveying system, and are fully cured when exiting the secondary heating zones. The fully cured parts are then finished (i.e. die-cut, water-jet cut, etc.) and packaged.

In another example, the shape molded parts can be fully cured in a batch process. In a batch process, the shape molded parts are collected after molding. A collection of shape molded parts are then placed into an oven for a predetermined time sufficient to fully cure the parts. The fully cured parts are then taken out of the oven. The batch process is flexible and allows the confection of the finished parts (i.e. cutting out of the desired shape) before or after the secondary curing operation. Other sources of heat for the secondary curing operation may be radiant heating, convection heating, microwave heating, a combination of sources, or any other suitable alternative heat or energy sources.

The molding processes 10, 110 provide several surprising findings. Some parts with various thicknesses ranging from highly compressed, thin areas to low density, thick, high loft areas (i.e. automotive hood liners) are difficult to cure while in the molding machine 14. This is applicable to parts impregnated with thermosetting binders that require elevated cure temperatures and high cure energies. These parts sometimes use double or triple typical cycle times to cure the part when compared to a phenol-formaldehyde (PF) binder. It was found surprisingly that shape molding followed by secondary curing operation is possible, and that those parts will keep their designed shape despite the core in high loft areas not being fully cured.

The molding processes 10, 110 also provide a process that improves the cycle time of the molding machine regardless of the nature of the binder chemistry and temperature sensitivity of components molded in the molding machine. Cycle times of molding machines are typically adjusted through increasing or decreasing temperatures during molding. However, minimizing cycle time through increasing temperatures is limited by the nature of the binder and components of the molded parts so that decomposition or damage to the molded parts is minimized.

In addition, the molding processes 10, 110 may be used with existing molding equipment. As a result, molding machine cycle times may be improved without obtaining new molding equipment thus minimizing capital costs.

Shape molding followed by secondary curing increases robustness. In particular, the molding processes 10, 110 can achieve fully cured products with high reliability despite product quality variations (density, moisture distribution and content, wet spots of the uncured blanks.)

The molding processes 10, 110 provide consistently fully cured parts regardless of product quality variations in the uncured blank. The uncured blank may be sold by a supplier to the manufacturer operating the molding processes 10, 110 as Shipout Uncured (SOUC). Variations in quality include density, density distribution, moisture, moisture distribution, binder concentration, and binder concentration distribution. These variations impact cure cycle time in a molding process that does not include a post-cure operation. In this example, cure cycle time is the minimum time needed to fully cure the binder within the entire molded part.

The molding processes 10, 110 may be used with various binder types. In one example, the binder is a Phenol-Formaldehyde (PF) thermosetting binder. PF binder cures relatively quickly at relatively low temperatures and requires relatively less heat energy to cure. However, PF binder is associated with various emission and toxicity concerns. In another example, the binder may be a formaldehyde-free binder. Formaldehyde-free binders may require relatively greater heat energy to cure the binder. As a result, molding-machine cycle times may be relatively large to completely cure an uncured blank using a formaldehyde-free binder.

Examples of formaldehyde-free binders are described in U.S. Pat. Nos. 7,854,980 B2, 5,977,232, 7,803,879, 6,699, 945, 5,318,990, 6,194,512, PCT publication PCT/US2006/ 028929, U.S. application Ser. Nos. 11/675,413, 12/599,858, WO2011/138459 A1, WO2011/138458 A1, WO2011/ 123593 A1, WO2012/152731 A1 and WO2011/022668, EP1732968, Patent Applications EP2386394 and EP2199332A1, Patent Applications US2009/0275699, and 2007/0292619 (each of which is incorporated by reference herein).

The uncured binder may comprises a carbohydrate reactant and/or a nitrogen-containing reactant. The nitrogen-containing reactant and the carbohydrate reactant may be Maillard reactants that react during curing to form Maillard reaction products, notably a melanoidin product. Curing of the binder may comprise or consists essentially of a Maillard reaction. The cured binder may comprises a melanoidin-containing and/or nitrogenous-containing polymer binder; this may be substantially water insoluble and/or substantially formaldehyde free.

The carbohydrate reactant may comprise: a monosaccharide, a disaccharide, a polysaccharide, a reducing sugar, molasses, starch, starch hydrolysate, cellulose hydrolysates, reaction product(s) thereof or mixtures thereof. While non-reducing sugars, for instance sucrose, may not be preferable, they may none-the-less be useful by in-situ conversion to a reducing sugar. The carbohydrate reactant may comprise a monosaccharide in its aldose or ketose form; it may comprise a triose, a tetrose, a pentose, xylose, a hexose, dextrose, fructose, a heptose, a polysaccharide, or combinations thereof. The carbohydrate reactant may comprise high fructose corn syrup or invert sugar. The carbohydrate reactant may have a dextrose equivalent of at least about 50, at least about 60, at least about 70, at least about 80 or at least about 90.

The nitrogen-containing reactant may comprise NH3, inorganic amine(s), organic amine(s) comprising at least one primary amine group, salts thereof and combinations thereof. For example, the nitrogen-containing reactant may comprise NH3 (e.g. in the form of an aqueous solution), any type of inorganic and organic ammonium salts, ammonium sulfate, ammonium phosphate, ammonium chloride, ammonium nitrate and combinations thereof. The nitrogen-containing reactant may comprise a polyamine; it may comprise a primary polyamine. Herein, the term "polyamine" includes any organic compound having two or more amine groups, which may independently be substituted. As used herein, a "primary polyamine" is an organic compound having two or more primary amine groups (—NH2). Within the scope of the term primary polyamine are those compounds which can be modified in situ or isomerize to generate a compound having two or more primary amine groups (—NH2). The primary polyamine may be a diamine, for example a di-primary diamine, triamine, tetraamine, or pentamine. The polyamine may comprise a diamine selected from 1,2-diaminoethane, 1,4-diaminobutane, 1,5-diaminopentane, 1,6-diaminohexane (hexamethylenediamine, HMDA), 1,12-diaminododecane, 1,4-diaminocyclohexane, 1,4-diaminobenzene, 1,5-diamino-2-methylpentane (2-methyl-pentam-ethylenediamine), 1,3-pentanediamine, and 1,8-diaminooctane. The nitrogen-containing reactant may comprise a primary polyamine polyether-polyamine; said polyether-polyamine may be a diamine or a triamine. In one embodiment, the polyether-polyamine is a trifunctional primary amine having an average molecular weight of 440 known as Jeffamine T-403 Polyetheramine (Huntsman Corporation). EDR-104 and EDR-148 (Huntsman) may also be used. The nitrogen-containing reactant may comprise a polymeric polyamine, for example chitosan, polylysine, polyethylenimine, poly(N-vinyl-N-methyl amine), polyaminostyrene, polyvinylamines, a polyvinyl amine (which may be a homopolymer or a copolymer).

The binder may comprising a silicon-containing compound, notably selected from the group consisting of gamma-aminopropyl-triethoxysilane, gamma-glycidoxy-propyltrimethoxysilane, aminoethylaminopropyl-trimethoxysilane, an aminofunctional oligomeric silane, and mixtures thereof.

The binder may comprising a non-aqueous moisturizer, for example a polyoxyalkylene glycol or a polypropylene glycol.

The binders may include ester and/or polyester compounds, for example in combination with a vegetable oil, such as soybean oil.

The carbohydrate reactant, may make up: at least 30%, preferably at least 40%, preferably at least 50%, more preferably at least 60%, more preferably at least 70%, even more preferably at least 80% by dry weight of the uncured binder; and/or less than 99%, preferably less than 97%, more preferably less than 95% by dry weight of the uncured binder.

The nitrogen-containing component, may make up less than 70%, preferably less than 50%, more preferably less than 30%, even more preferably less than 20% by dry weight of the uncured binder; and/or at least 2.5%, preferably at least 5%, more preferably at least 10% by dry weight of the uncured binder.

The molding processes 10, 110 also minimize the presence of acidic byproducts of uncured or partly cured products. SOUC parts based on polyester and polyamide chemistries (i.e. polyacrylic acid or styrene-maleic-anhydride based binders) may have an acidic to neutral pH which will become neutral to alkaline upon full cure. The corrosivity of the uncured or partly cured binder decreases with fully curing the binder. As a result, the pH of the binder increases.

As a result, the molding processes 10, 110 minimize the corrosiveness of parts including binders based on polyester and polyamide chemistries.

A cured product in accordance with the present disclosure may be used for sound absorption or a thermal shield. Sound absorption may be desired in flat architectural applications (i.e. wall system for office spaces and theatres) and contoured parts in automotive applications (i.e. hood liners). Some molded parts are used in Original Equipment Manufacturers (OEM) equipment for sound absorption (HVAC equipment, clothes washers, clothes dryers, dishwashers, etc.).

A cured product may have a width of about one inch to about six feet. A cured product may have a length of about of about two inches to about twelve feet. The cured product may have a thickness of about ⅛ of an inch to about two inches in one example. In another example, the cured product may have a thickness less than ⅛ of an inch and greater than two inches. The cured product may have a density of about one pound per cubic foot to about 50 pounds per cubic foot. In addition, the density and dimensions of the cured product may vary throughout the cured product.

TABLE 1

Comparison of cycle times to full cure of an uncured product for two different binders types with and without convection heating in the mold cavity

| | Cycle time (min) | | | |
| --- | --- | --- | --- | --- |
| Sample | Shape Molding No Convection Heating | Shape Molding with Convection Heating | Full Cure No Convection Heating | Full Cure with Convection Heating |
| 1 Formaldehyde-Free Binder, 4 lb/cubic foot density, 15% LOI, 1 inch Loft, 380 degrees Fahrenheit | 5.50 | 1.00 | 7.10 | 2.00 |
| 2 PF Binder, 4 lb/cubic foot density, 15% LOI, 1 inch Loft, 380 degrees Fahrenheit | 3.00 | 1.00 | >3.00 | 1.50 |

The invention claimed is:
1. A molding process for molding a cured product, the molding process comprising
   providing an uncured blank including fibers and uncured binder,
   inserting the uncured blank in a mold cavity formed in a mold,
   closing the mold to trap the uncured blank in the mold cavity to cause the uncured blank to assume a molded shape,
   transferring a shaping heat to the uncured blank to cause a portion of the binder to be cured so that the molded shape is retained after the removal from the mold and a shaped product is established,
   opening the mold to release the shaped product,
   inserting the shaped product in a heater, and
   transferring a curing heat to the shaped product to cause a remainder of the uncured binder to cure so that a cured product is established, wherein curing of the binder consists essentially of a Maillard reaction.

2. The molding process of claim 1, wherein the uncured binder is a substantially formaldehyde free binder.

3. The molding process of claim 1, wherein during transferring the shaping heat, the shaping heat is applied by the mold.

4. The molding process of claim 1, wherein during transferring the curing heat, the curing heat is applied by a heating unit in spaced-apart relation to the mold.

5. The molding process of claim 1, wherein the uncured blank is exposed to a temperature of about 200 degrees Fahrenheit to about 500 degrees Fahrenheit.

6. The molding process of claim 1, wherein transferring the shaping heat occurs during a first cycle time.

7. The molding process of claim 6, wherein transferring the curing heat occurs during a second cycle time and the second cycle time is larger than the first cycle time.

8. The molding process of claim 1, wherein the fibers are glass fibers.

9. The molding process of claim 1, wherein the uncured binder comprises:

at least 50% by dry weight of a carbohydrate reactant selected from one or more reducing sugars, one or more carbohydrate reactants that yield one or more reducing sugars in situ under thermal curing conditions and combinations thereof; and at least 10% by dry weight of a nitrogen-containing reactant selected from ammonia, ammonium salts, inorganic amines, inorganic amine salts, organic amines comprising at least one primary amine group, salts of organic amines comprising at least one primary amine group, and combinations thereof.

10. The molding process of claim 9 wherein the carbohydrate reactant comprises high-fructose corn syrup.

11. The molding process of claim 9 wherein the nitrogen-containing reactant comprises ammonium sulfate, ammonium phosphate or combinations thereof.

12. The molding process of claim 1, wherein the cured binder comprises a substantially water insoluble nitrogen containing polymer.

* * * * *